US012242334B2

(12) United States Patent
Hogan et al.

(10) Patent No.: US 12,242,334 B2
(45) Date of Patent: Mar. 4, 2025

(54) SYSTEM AND METHODS FOR APPLICATION FAILOVER AUTOMATION

(71) Applicant: The Bank of New York Mellon, NY, NY (US)

(72) Inventors: William A. Hogan, Chelmsford, MA (US); Anil K. Vellala, West Windsor, NJ (US); Venkata R. Suda, Edison, NY (US); Benjamin Nien-Ting Wu, San Francisco, CA (US)

(73) Assignee: THE BANK OF NEW YORK MELLON, New York, NY (US)

( * ) Notice: Subject to any disclaimer, the term of this patent is extended or adjusted under 35 U.S.C. 154(b) by 449 days.

(21) Appl. No.: 17/679,879

(22) Filed: Feb. 24, 2022

(65) Prior Publication Data

US 2023/0267035 A1    Aug. 24, 2023

(51) Int. Cl.
    *G06F 11/00*      (2006.01)
    *G06F 11/07*      (2006.01)

(52) U.S. Cl.
    CPC ...... *G06F 11/0793* (2013.01); *G06F 11/0721* (2013.01)

(58) Field of Classification Search
    CPC ............. G06F 11/0793; G06F 11/0721; G06F 11/079; G06F 11/162; G06F 11/321; G06F 11/324; G06F 11/328
    See application file for complete search history.

(56) References Cited

U.S. PATENT DOCUMENTS

2016/0048408 A1    2/2016    Madhu et al.

OTHER PUBLICATIONS

Business Process Incubator, How to Create a Runbook, Oct. 15, 2021, 9 pages (Year: 2021).*
Visual Paradigm, Online BPMN Tool, Feb. 27, 2018, https://online.visual-paradigm.com/ (Year: 2018).*
International Search Report and Written Opinion of the International Searching Authority dated Jun. 14, 2023, issued in corresponding International Application No. PCT/US2023/012072 (10 pgs.).
International Preliminary Report on Patentability dated Aug. 27, 2024, issued in corresponding International Application No. PCT/US2023/012072 (8 pgs.).

* cited by examiner

*Primary Examiner* — Katherine Lin
(74) *Attorney, Agent, or Firm* — Pillsbury Winthrop Shaw Pittman, LLP

(57) ABSTRACT

Provided is a failover automation system and method comprising: obtaining, by a processor, a process inventory for a failover of an application from a first datacenter to a second data center; generating, by the processor, a data model for the failover based on the process inventor; generating, by the processor, a workflow for the failover based on the data model; assembling, by the processor, a set of one or more virtual engineers to perform the failover for the application based on the workflow; and performing, by the processor, the failover for the application with the set of one or more virtual engineers based on the workflow.

27 Claims, 14 Drawing Sheets

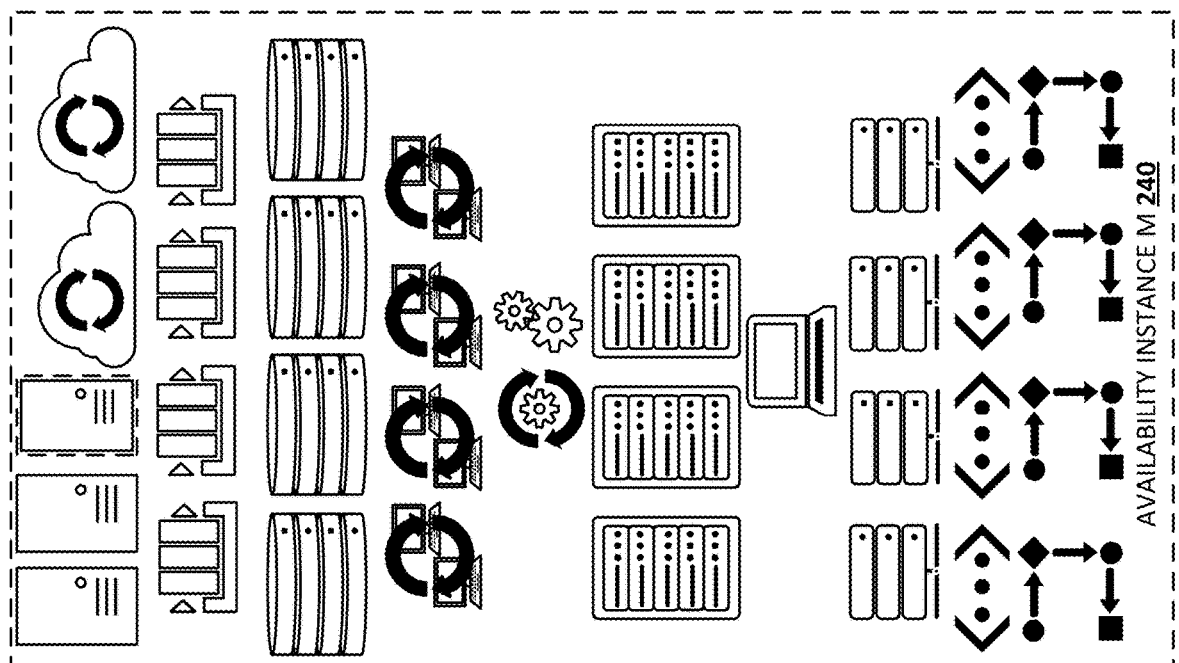
SERVER 202
MESSAGING 204
DATABASE 206
MIDDLEWARE 208
PROCESSES/SERVICES 210
MAINFRAME 212
NETWORKING 214
STORAGE 216
APIS AND/OR MICROSERVICES 218
BATCH JOBS 220
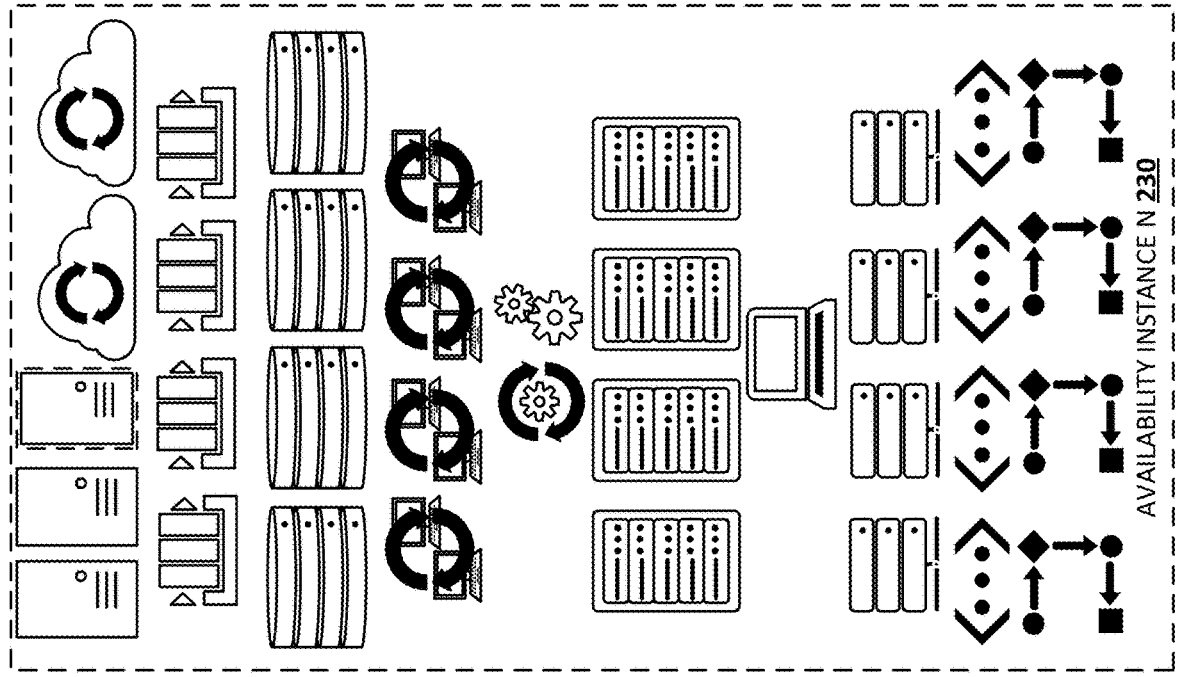
FIG. 2

| Component Type | | Inventory Attributes |
|---|---|---|
| Tier | Product | |
| Database | SQL Server | DNS, Host Name |
| Database | Oracle | DB Name, Current Datacenter, Destination Datacenter |
| Database | Mongo | Host Name, App Mnemonic, Target Environment (e.g., Quality Assurance, Production, Development, etc.) |
| Database | PostgreSQL | Postgres - DNS, Host Name |
| Database | UDB | UDB - Host Name, Database Name, Instance Name, Alias Name, DB Port Number |
| Application | AppEngine Scale | Cluster Name, Application Family Name, Application Name, Application Service Name, Application Space Name, Number of Instances, Environment |
| Application | AppEngine Service Status | Cluster Name, Application Family Name, Application Name, Application Space Name, Environment |
| Application | AppEngine Route Status | Cluster Name, Application Route URL, Application Space Name, Environment |
| Application | AppEngine Route Enable | Cluster Name, Application Family Name, Application Name, Application Service Name, Application Space Name, Environment, Application Deployment Configuration, Application Route URL, Route Action, Assembly File |
| Application | AppEngine Route Disable | Cluster Name, Application Family Name, Application Name, Application Service Name, Application Space Name, Environment, Application Deployment Configuration, |
| Application | AppEngine Application Stop | Cluster Name, Application Family Name, Application Name, Application Space Name, Environment |
| Storage | SRDF-TEST | Hostname, Source Datacenter, Destination Datacenter, Action |
| Storage | SRDF-Status | Hostname, Source Datacenter, Destination Datacenter, Action |
| Storage | SRDF-FOS | Hostname, Source Datacenter, Destination Datacenter, Action |
| Storage | NAS-Status | Application Mnemonic, Execution Type, Ansible Job Template |
| Storage | NAS Volume | Volume, Execution Mode, Ansible Template ID, Max Time |
| Storage | NAS-MNE | Application MNE, Execution Mode, Step, Mode, Ansible Template ID, Max Time |
| Storage | NAS Mount | Host Name, Client Path, Inventory ID, Ansible Template ID, Max Time |
| Storage | NAS Unmount | Host Name, Client Path, Inventory ID, Ansible Template ID, Max Time |
| Messaging | MQ Failover | Queue Manager Name, Failover Type |
| Messaging | MQ Precheck | Queue Manager Name, Failover Type |
| Messaging | MQ Postcheck | Queue Manager Name, Failover Type |

| Component Type (Continued) | | Inventory Attributes |
|---|---|---|
| Tier | Product | |
| Application | Windows Script | Hostname, Script Path, Expected Output, Parameters |
| Application | Windows Services | Hostname, Service Name, Action Type, Expected Output, Startup Type |
| Application | Linux Script | Hostname, Expected Output, Script Path, Parameters, Run Account ID |
| Application | Linux Services | Hostname, Service Name, Action Type, Expected Output, Run Account ID |
| Application | API-Get | Target URL, Authentication Type, Header, Expected Output |
| Application | API-PUT | Target URL, Header, Request Boyd, Authentical Type, Expected Output |
| Application | API-Post | Target URL, Header, Request Boyd, Authentical Type, Expected Output |
| Application | Health Check URL | Target URL, Authentication Type, Header, Expected Output |
| Application | IIS Status | Hostname, Action, Expected Output, Max Time |
| Application | IIS Reset | Hostname, Action, Expected Output, Max Time |
| Application | IIS Start | Hostname, Action, Expected Output, Max Time |
| Application | IIS Stop | Hostname, Action, Expected Output, Max Time |
| Application | Citrix Start | Hostname, Service Name, Action, Expected Output, Startup Type, Max Time |
| Application | Citrix Stop | Hostname, Service Name, Action, Expected Output, Startup Type, Max Time |
| Application | Citrix Status | Hostname, Service Name, Action, Expected Output, Startup Type, Max Time |
| Application | Verbose | Application Family Name, Application Name, Cluster Name Application Optional Space Name, Service Name, Number of Instances |
| Task Scheduler | Enable | Hostname, Action, Task Name, Max Time, Sleep Time |
| Task Scheduler | Disable | Hostname, Action, Task Name, Max Time, Sleep Time |
| Task Scheduler | Status | Hostname, Action, Task Name, Max Time, Sleep Time, Output Type, Expected Output |
| Task Scheduler | Start | Hostname, Action, Task Name, Max Time, Sleep Time |
| Task Scheduler | Stop | Hostname, Action, Task Name, Max Time, Sleep Time |

FIG. 3B

| Other Applications | Inventory Attributes |
|---|---|
| EQE | GIT URL, GIT Token, GIT Branch, Test Type, Test Execution Platform, Max Time, Sleep Time |
| IIS Website Start | Hostname, Action, Website Name, Max Time, Sleep Time |
| IIS Website Stop | Hostname, Action, Website Name, Max Time, Sleep Time |
| IIS Website Status | Hostname, Action, Website Name, Expected Output Type, Expected Output |
| GSLB-Cumulus | Action, GSLB Name, Action Name (e.g., Status, Enable, Disable, Priority Change, etc.), Template ID |
| GSLB-GTM5 | Action, GSLB Name, Action Name (e.g., Status, Enable, Disable, Priority Change, etc.), Group Name, Template ID, Priority |
| Application Pool - Start | Hostname, Application Pool Name, Action |
| Application Pool - Stop | Hostname, Application Pool Name, Action |
| Application Pool - Status | Hostname, Application Pool Name, Action, Expected Output |
| URL Validation | Target URL, Action, Expected Output |
| VCS Start | Hostname, Inventory ID, Template ID |
| Delay Timer | Delay Time |
| Email | Email Body, Email Subject, To Address, CC Address |
| Ansible Check (FOS) | Ansible Template ID, Ansible Extra Variables |
| Ansible Execute Workflow | Ansible Template ID, Ansible Extra Variables |

| Step | Tier | Product | Action | Step Action |
|---|---|---|---|---|
| 0 | Approval | Approval | Approval | Approval or Intiation of Failover |
| 1 | Database | SQL Server | Precheck | Backup SQL Server Precheck |
| 2 | Database | SQL Server | Failover | SQL Server Failover |
| 3 | Application | AppEngine | Delay Timer | Delay Timer For Server Rerouting |
| 4 | Database | SQL Server | Postcheck | SQL Server Operational Postcheck |
| 5 | Application | Ansible | Execute Ansible Template | Execute Ansible Template |
| 6 | Application | AppEngine | Delay Timer | Delay Timer For Ansible Execution |
| 7 | Application | AppEngine | Route Status | Route Status Check |
| 8 | Application | AppEngine | Container Status | Container Status Check |
| 9 | Application | AppEngine | Route Status | Route Status Check |
| 10 | Application | AppEngine | Container Status | Container Status Check |
| 11 | Application | AppEngine | Container Status | Container Status Check |
| 12 | Application | AppEngine | Container Status | Container Status Check |
| 13 | Application | AppEngine | Container Status | Container Status Check |
| 14 | Application | AppEngine | Container Status | Container Status Check |
| 15 | Application Validation | Application Validation | Application Validation | Validation of Failover Application |
| 16 | Business Validation | Business Validation | Business Validation | Business Level Validation of Failover Application |

FIG. 4

| Step Description | MyApplication DB Failover |
|---|---|
| Database Tier | SQL Server |
| Tier | Database |
| Product | SQL Server |
| Type | Automated |
| Action | Failover |
| Step | 2 |
| Dependent Step | 1 |
| From DC | TPC |
| To DC | CNJ |
| Instance Name | DBHostname |

| JSON Input | Mapped to BPMN XML | Mapped to Metadata Store |
|---|---|---|
| Component Name | X | |
| Component Execution Type | | X |
| Instance DC | | X |
| Tier | | X |
| Product | | X |
| Action | | X |
| Instance Name | | |
| From Datacenter | X | |
| To Datacenter | X | |
| Step Number | | X |
| Dependencies | | X |
| Workflow Identifiers | | X |

| Product Name | Virtual Engineer Action(s) |
|---|---|
| Ansible | Execute Ansible Template |
| AppEngine | Container Status |
| | Container Start |
| | Container Stop |
| | Scale Down |
| | Scale Up |
| | Actuator Health Check |
| | Application Stop |
| | Container Verbose Status |
| | Delay Timer |
| | Route Enable |
| | Route Disable |
| | Route Status |
| Application Pools Service | Status |
| | Start |
| | Stop |
| Application Validation | Application Validation |
| Approval | Approval |
| Backup | Status by MNE |
| | Status by Hostname |
| Business Validation | Business Validation |
| Citrix Service | Status Service |
| | Start Service |
| | Stop Service |
| Custom | Custom App Action |
| | Custom Actions |
| | Custom DB |
| Database Validation | Database Precheck |
| | Database Postcheck |
| Email Notification | Send Custom Email |
| EQE | Trigger Automation Testing |

FIG. 7A

| Product Name (Continued) | Virtual Engineer Actions(s) |
|---|---|
| GSLB | GTM F5 |
| | Cumulus |
| Health Check | Plain URL Health Check |
| | URL Validation |
| IIS | Status Website |
| | Start Website |
| | Stop Website |
| | Status |
| | Start |
| | Stop |
| | Reset |
| Linux Service | Execute Linux Script |
| | Status Process |
| | Start Process |
| | Stop Process |
| Mongo | Failover |
| MQ | Failover |
| | Precheck |
| | Postcheck |
| NAS | NFS Mount |
| | NFS Unmount |
| | NAS FoS Status |
| | NAS FoS By MNE |
| | NAS FoS By Volume |
| Oracle | Switchover |
| | Exadata Switchover |
| | Oracle Custom DB |
| | Precheck |
| | Postcheck |
| PostgreSQL | Failover |

| Product Name (Continued) | Virtual Engineer Actions(s) |
|---|---|
| REST API | Status Service - Execute API |
| | Start Service - Execute API |
| | Stop Service - Execute API |
| | POST |
| | GET |
| | PUT |
| | API |
| Script | Status Service - Linux Script |
| | Start Service - Linux Script |
| | Stop Service - Linux Script |
| | Status Service - Windows Script |
| | Start Service - Windows Script |
| | Stop Service - Windows Script |
| SQL Server | Failover |
| | Precheck |
| | SQL Server Custom |
| | Postcheck |
| SRDF | FoS |
| | Status |
| | Test |
| Task Scheduler Service | Enable |
| | Disable |
| | Status |
| | Start |
| | Stop |
| UDB | Failover |
| Validation | Infra Validation |
| | URL Validation |
| | Custom Validation |
| VCS | Start |
| | Stop |
| Windows Service | Status Service |
| | Start Service |
| | Stop Service |
| | Execute Windows Script |

FIG. 7C

SYSTEM AND METHODS FOR APPLICATION FAILOVER AUTOMATION

TECHNICAL FIELD

The present disclosure relates generally to application instance migration, and more particularly to systems and methods for providing failover automation.

BACKGROUND

Applications that must be highly reliable and resilient are generally configured to have redundant instances. These instances are typically spread across locations to allow for a degree of geographical isolation in the event a disaster or unexpected event occurs in a particular geography. During an actual disaster event, or during an event to test application's ability to handle a disaster event, switching the application's primary instance (also known as "failover") typically involves a number of configuration changes and technology activities. These activities often have to be well coordinated between teams that own the application and their teams that manage the infrastructure components and services.

Computing applications interact with various data repositories, such as servers, databases, datacenters, etc., during the course of their operation. Some computing applications may also be hosted on remote computing elements. In the event that such remote data repositories and computing elements are unavailable (i.e., offline, damaged, etc.), such as due to a datacenter failure, applications can be switched to run at or on alternative data repositories and/or computing elements in a "failover" operation. Switching an application from a first (or primary) instance or location to a second (or secondary) instance or location in a failover can involve changing one or more paths, servers, databases, configurations, technologies, etc., for an application and initializing one or more instances of the application in the secondary location. Application reliability, resiliency, and continuity is thereby correlated to failover reliability, robustness, and speed.

Companies typically have a number of applications and services which are required to have certain levels of redundancy, e.g., based on specific recovery time objectives for specific applications and services. Often, the process by which applications exercise redundancy capabilities (i.e., failover) requires (1) primarily manual activity; (2) periodic (e.g., monthly, quarterly, yearly, etc.) tests to ensure readiness to failover in the event of an actual disaster, orchestration of which is manually intensive with no systematic visibility into the state of procedural execution as steps are initiated, completed, or fail); and (3) fully manual documentation of redundancy procedures, which is subject to quickly becoming outdated as services evolve and infrastructure naturally is maintained and scaled.

Due to the complexity of monitoring and implementing failover in the event of an application or service failure, current failover systems and methods present a variety of problems, including the following: (a) Break-the-Glass Access can add significant duration to the time to failover. (b) Notifying infrastructure teams naturally adds latency to each infrastructure failover step. (c) There is a lack of visibility to the progress of each infrastructure failover. (d) Testing of infrastructure post failover is manual. (e) There is no systemic visibility into failures, thus no audit trails for items that require remediation.

What is needed, therefore, is a solution which addresses these and other limitations of present failover processes.

SUMMARY

The following is a non-exhaustive listing of some aspects of the present techniques. These and other aspects are described in the following disclosure.

Some aspects include a method for providing process automation, including failover automation, comprising: obtaining, by a processor, a process inventory for a failover of an application from a first datacenter to a second data center; generating, by the processor, a data model for the failover based on the process inventor; generating, by the processor, a workflow for the failover based on the data model; assembling, by the processor, a set of one or more virtual engineers to perform the failover for the application based on the workflow; and performing, by the processor, the failover for the application with the set of one or more virtual engineers based on the workflow.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

Features, aspects, and embodiments of the present disclosure are described in conjunction with the attached drawings, in which:

FIG. 2 is a schematic view illustrating components of an application instance migration from a first availability instance to a second availability instance, in accordance with some embodiments of the present disclosure.

FIGS. 3A-3C depict charts listing example components of which may include an application instance and their attributes for an automated application failover system, in accordance with some embodiments of the present disclosure.

FIG. 4 depicts a chart listing example steps for an application failover process, in accordance with some embodiments of the present disclosure.

FIG. 5 depicts a chart listing example input for a step in an application failover process, in accordance with some embodiments of the present disclosure.

FIG. 6 depicts a chart showing example partition of steps between data storage modes for a step in an application failover process, in accordance with some embodiments of the present disclosure.

FIGS. 7A-7C depict charts listing example products and corresponding virtual engineers for an application process failover, in accordance with some embodiments of the present disclosure.

Figure 1:
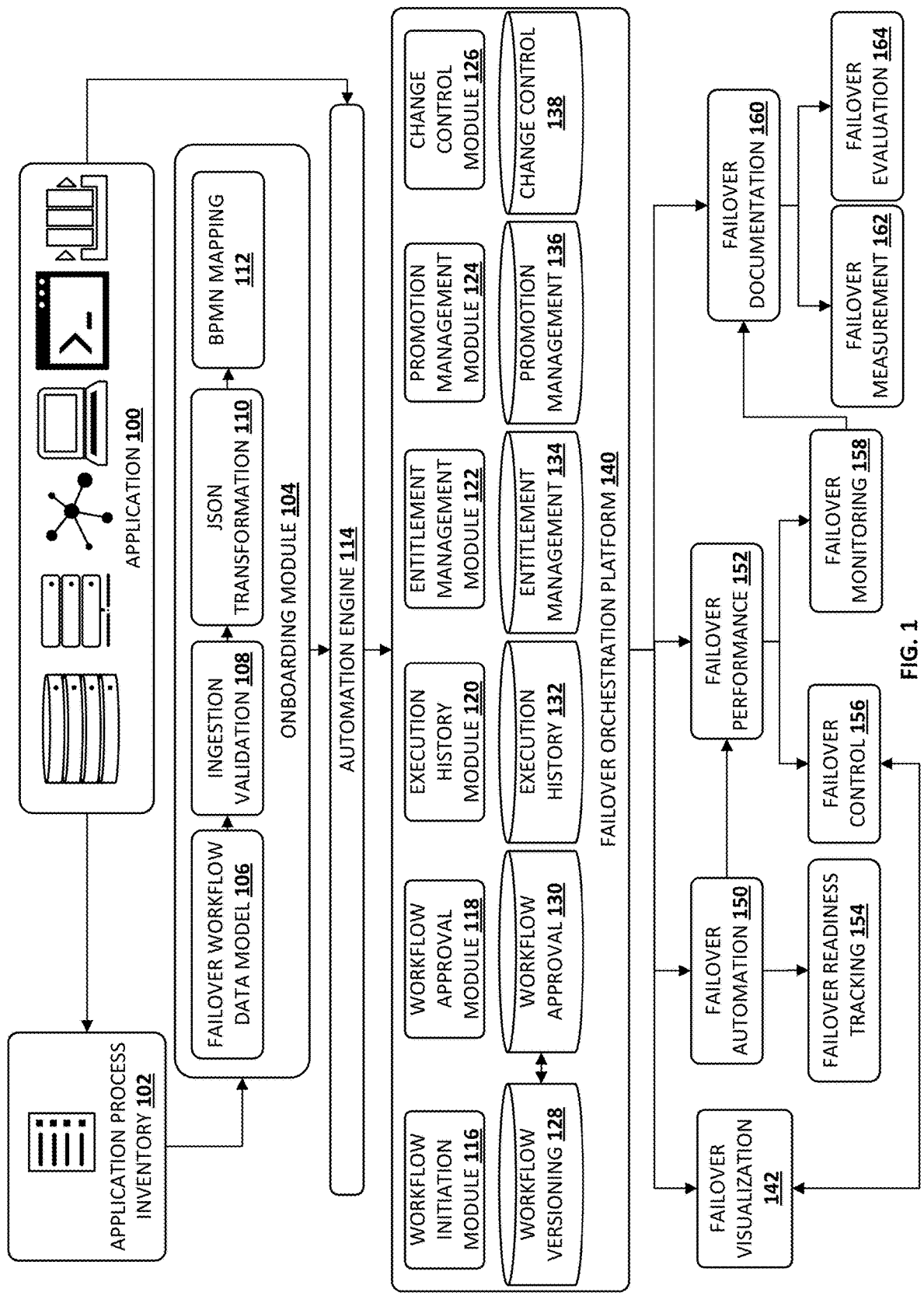
FIG. 1 is a schematic view illustrating an automated application failover system, in accordance with some embodiments of the present disclosure.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION

To mitigate the problems described herein, the inventors had to both invent solutions and, in some cases just as importantly, recognize problems overlooked (or not yet foreseen) by others in the field of computing systems. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

While some of the embodiments below are described in relation to failover, it will be understood that the systems and methods described herein may apply equally to planned or unplanned switching operations for applications. Other application switching operations may include, for example, switching production databases, alternating between production and development databases, server maintenance support, failover readiness testing, to name just a few. Thus, the following descriptions should not be seen to limit the system, methods, and machine-readable medium described herein to any particular type of application switching operation.

As discussed above, for various reasons an application (in one or more instances) may be discontinued in a current (or primary) datacenter. As many applications are vital for business purposes—including client needs, documentation, regulatory requirements—a discontinued application may then be migrated to another datacenter or otherwise initialized in a secondary or backup location. Failover automation, and automation of other migration processes, allows greater process control during switching of the application instances. Accordingly, failover, as understood herein, may generally refer to systems and methods of protecting computer systems and/or programs from failure, in which standby systems and/or programs are enabled to automatically take over when the main systems and/or programs fail.

Systems and methods of the present disclosure provide for failover automation. In various embodiments, an application instance failover process may be quantified and entered into a runbook template. The application failover process may include failover of one or more data repository, program, etc., including server, messaging and/or a messaging queue, database, middleware, application process, application service, mainframe, networking, storage, application programming interface (or API), microservices, batch or individual jobs, etc. The individual components of the application which interact with the datacenter are catalogued, inventoried, and ordered, where ordering may include component dependency information.

Based on the runbook template or other process inventory, a data model may be generated for the application failover. The data model may then be ingested into the automation engine, and a workflow for the failover may be generated. Various virtual engineers may then be assembled to implement the workflow for the automated failover. A visualization for the automated failover may then be generated, based on the workflow.

In some embodiments, the automated failover process includes monitoring of the failover process, such as run time monitoring (e.g., monitoring against recover time objectives, etc.). The automated failover process may also include monitoring of the failover process at various levels. The failover process may be imitated and tested synthetically, such as to monitor failover readiness, without actually switching datacenters. The automated failover process may be monitored and triaged during run time, including, for example, on a step-by-step level. The automatic failover process may be evaluated against goals (for example, against down time goals or recovery time objectives) or against previous failover processes and automatic failover process workflows.

FIG. 1 illustrates a schematic view of an automated application failover system, in accordance with some embodiments of the present disclosure. An application 100, which may include one or more application instances, interacts with one or more datacenter data repositories or services. The application 100 may interact with one or more database services, storage services, network services, computational services, container services, messaging services, etc. The list of services provided is exemplary only and should not be construed as a closed list of possible services. In some embodiments, the identity of the application 100 may determine with which services and/or which datacenters the application 100 interacts. In some embodiments, a list of application interactions may be maintained, such as a list maintained for performing a manual failover. In other embodiments, a program (such as a program which tracks and identifies network traffic) may be used to determine with which datacenter services the application 100 interacts.

In some embodiments, applications (and other programs) may interact with users, other applications, various datacenter and/or cloud storage, databases, etc. Applications may run based on databases stored remotely, which may be accessed and/or managed through communication between the application and a SQL Server, Oracle DB, Mongo DB, PostgreSQL, UBD (or other object-oriented relational database management system (OORDBMS)), etc. Applications may be hosted, such as by a proprietary On-Premise application Hosting Platform or a commercially available Cloud Hosting Platform or another container engine or container orchestration system, as various individual instances. Applications may leverage datacenter storage based on Symmetric Remote Data Facility (SRDF), Network Attached Storage (NAS), etc. Applications may also exchange messages, such as through Messaging Queue (MQ) or another appropriate messaging platform. Applications may operate on Windows, Linux, Apple, etc. operating systems. Applications may exchange information via one or more Application Programming Interface (API). Applications may interact with application servers such as Microsoft Internet Information Services (IIS), or other web servers. Applications may be accessed remotely, which instances operate at a datacenter, such as via Citrix or Virtual Private Network (VPN) or other clients. Applications traffic and loads may be balanced between instances, servers, datacenters, etc. by Global Service Load Balancing (GSL) or other load balancing programs. Cluster services may be provided by Veritas Cluster Server (VCS) or other cluster management programs. Applications may include automated tasks, such as, for example, those programmed in Ansible. Applications may operate in any appropriate programming language and data exchange configuration.

In some embodiments, based on the application 100, an application process inventory 102 may be generated. The application process inventory 102 may be, for example, a runbook or runbook template. As understood herein, a runbook is a compilation of ordered operations and/or procedures for performing a given process. For example, a failover runbook may contain information about the processes, dependencies, ordering, operations, applications, databases, etc. for performing failover for an application, which may be the application 100.

The application process inventory 102 may be input into a runbook template, where the runbook template includes a list of possible components to the failover—for example database tier events, application tier events, storage tier events, messaging tier events, etc. The application process inventory 102 may be saved to a change control database or module and may function as a record of the application failover process and change control. The application process inventory 102 may be, for example, a Microsoft Excel or other spreadsheet type document. The application process inventory 102 may be an eXtensible Markup Language (XML) object. Once the application process inventory 102 is complete, in some embodiments, it may be ingested by the onboarding module 104. The application process inventory 102 may also be tested for completeness by the onboarding module 104.

In some embodiments, the onboarding module 104 may generate a failover workflow data model 106, e.g., based on the application process inventory 102. The failover workflow data model 106 can be constructed of granular components, where each component represents a step, substep, component specific step, etc. from the application process inventory 102. The size of a step or substep of the application process inventory 102 and/or the failover workflow data model 106 may be arbitrary, and in some cases a substep and/or dependent step can represent a longer process and/or a process which requires more bandwidth than represented by a step. The organization of the steps and/or substeps can be dependent on the architecture of virtual engineers or other program components. The failover workflow data model 106 may be the application process inventory 102 but may also be transformed from one file format and/or data structure to another to generate the failover automation. Alternatively or additionally, the onboarding module 104 may operate directly on the application process inventory 102. The failover workflow data model 106 may include one or more steps in the failover process, their associated components, their dependencies, their operation locations, etc. One or more steps may be added to the failover workflow data model 106 to join various steps of the failover, such as timer steps, validation steps, triggering steps, etc.

In some embodiments, the onboarding module 104 may perform an ingestion validation 108 against the failover workflow data model 106. The onboarding module 104 may determine if the failover workflow data model 106 is supported for further processing—e.g., if the data type and format are correct for further operations. If the ingestion validation 108 determines that the failover workflow data model 106 is not operable, an error may be triggered and the failover workflow data model 106 may be updated or corrected. The ingestion validation 108 may be shown as a single step but may occur at multiple instances in the onboarding module 104 (such as, for example, when the failover workflow data model 106 is transformed into a different file or data type).

The ingestion validation 108 may encompass determining if the attributes and/or values specified in the failover workflow data model 106 are accurate. Accuracy can be determined based on correct and/or expected data types, units, metrics, etc. For example, if an integer value is expected but a DNS address is supplied, the attribute can be determined to be inaccurate. In some cases, the ingestion validation 108 may encompass determining if specific attributes, such as file locations, settings, ports, etc. are accurate. Determining if specific attributes are accurate may encompass communicating with or otherwise interacting with the specified attributes—i.e., by transmitting data to or from locations, with specific settings, through one or more port, etc. The ingestion validation 108 may encompass performing a partial failover or step and/or subset of the failover, such as communicating with or initializing an application occurrence at a backup location while not ending an occurrence of an application at a primary location.

In some embodiments, the onboarding module 104 may then apply a JSON transformation 110 to the failover workflow data model 106. The failover workflow data model 106 may be transformed into a JavaScript Object Notation (JSON) model or data exchange format, or another appropriate format. The failover workflow data model 106 may be generated by a portal service. The JSON transformation 110 may produce encoded steps for each step of the failover workflow data model 106. For example, the JSON transformation 110 may encode information about the component name, component execution type, datacenter instance, tier, product, action, instance name, from datacenter, to datacenter, step number, dependency (and information about various dependencies), workflow field name, etc. Various steps may have more or fewer information inputs in the JSON transformation, as will be discussed in reference to FIGS. 3A-3C. The JSON transformation 110 may include one or more pre-defined steps (i.e., commonly used steps, such as MQ failover steps) or may be custom generated based on need particular to the application 100.

In some embodiments, the onboarding module 104 may then generate a BPMN mapping 112 of the failover workflow data model 106. The BPMN mapping 112 may be a Business Process Model and Notation (BPMN) 2.0 specification or model, or a specification or model in another appropriate format. The BPMN mapping 112 may include, for example, two subsets: a BPMN XML markup and a set of values or run-time metadata. For example, BPMN XML data may include component name, to datacenter, and from datacenter, and stored relational data may include product, name, action, and other information.

The BPMN mapping 112 can comprise a workflow visualization. The BPMN mapping 112 can take the form of a workflow visualization or the workflow visualization can be generated concurrently with or subsequent to the BPMN mapping 112. The workflow visualization, which can be part of the BPMN mapping 112, may contain components which correspond to the components of the application for failover.

The workflow visualization can be adjusted by the inclusion of additional components and/or alternate components, which can represent additional, optional, alternative, etc. components, subcomponents, steps, substeps, etc. in one or more failover processes. For example, a component representing an alert (i.e., a text message alert to one or more process owners) can be added at various points in the BPMN mapping 112 and/or workflow visualization. The workflow visualization which corresponds to the BPMN mapping 112 can also be further refined or divided, where visualization complexity and detail can correspond to process importance, operator skill, automation level, etc. In some cases, a workflow visualization can be refined with steps removed or added based on operational needs and relative success or various components. To continue the above example, components representing or triggering an alert can be removed or reduced if a failover process is proven to be significantly successful.

Once the BPMN mapping 112 is complete, an automation engine 114 may be used to generate a failover orchestration platform 140. The automation engine 114 may be any appropriate automation engine or software which operates on BPMN data formats or another appropriate format type.

In some embodiments, the failover orchestration platform 140 may include one or more of a workflow initiation module 116, a workflow approval module 118, an execution history module 120, an entitlement management module 122, a promotion management module 124, and a change control module 126, and one or more of data stores, including a workflow versioning datastore 128, a workflow approval datastore 130, an execution history datastore 132, an entitlement management datastore 134, a promotion management datastore 136, and a change control datastore 138. The failover orchestration platform 140 may include additional modules and datastores and is not limited to the workflows and datastores depicted.

In some embodiments, the failover orchestration platform 140 may produce a failover automation 150, which may include one or more virtual engineers to which automate the failover workflow data model 106. The failover automation 150 may also include failover readiness tracking 154. The failover readiness tracking 154 may operate on the failover automation to test, for example by initiating a synthetic failover, the operability and readiness of the failover automation 150.

In some embodiments, the failover orchestration platform 140 may monitor failover performance 152, based on one or more metrics (e.g., such as timer, binary success trackers, etc.) embedded in the failover automation 150. The failover performance 152 may be monitored at the coarse-grained level, i.e., the application level, and/or at the fine-grained level, i.e., the component level. For example, a total recover time can be determined as well as a component time for one or more individual component. Likewise, binary success trackers can be used to determine where in the process a failover was unsuccessful and to judge the success of each component. The failover performance 152 can also be monitored based on path—where alternative failover processes can be included within the failover workflow data model 106 and/or the failover automation 150. A failover performance 152 may be successful, while one or more components was unsuccessful and/or one or more alternative and/or backup components was triggered or performed. The failover performance 152 may also include one or more of failover control 156 and failover monitoring.

In some embodiments, the failover orchestration platform 140 may produce a failover visualization 142 or workflow representation based on the failover workflow data model 106. The failover visualization may be operable for one or more user or technician to track or otherwise monitor the failover automation 150. The failover visualization may be integrated with the failover control 156, which may also be used to adjust the failover automation 150 (e.g., bypass one or more step of the failover automation 150) or otherwise monitor the progress of the failover automation 150. The failover monitoring 158 may also be used with or be displayed within the failover visualization 142.

In some embodiments, the failover orchestration platform 140 may also produce and/or store failover documentation 160. The failover documentation 160 may include metric and parameters of the failover monitoring 158, information about the failover workflow data model 106, and expected or target values for the failover automation 150. The failover documentation 160 may include failover measurement 162, such as storage of metrics, and failover evaluation 164, which may include failure root cause analysis and be used to adjust the failover workflow data model 106.

FIG. 2 is a schematic view illustrating components of an application migration from a first availability instance to a second availability instance, in accordance with some embodiments of the present disclosure. FIG. 2 depicts an availability instance N 230 and an availability instance M 240, for an example application. The example application may operate upon one or more servers 202, which may include one or more of a virtual server, a cloud server, etc. The example application may receive and send messages from one or more messaging queues 204. The example application may operate one or more processes and/or services 210. The example application may communicate with one or more databases 206, storage devices 216, and/or mainframes 212, such as over one or more networks 214. The example application may communicate with or operate via one or more middleware software applications 208, application programming interfaces (APIs) and/or microservices 218. The example application may operate one or more jobs, including batch jobs 220. The operations in which the example application interacts with the availability instance N 230 may be switched to the availability instance M 240 in a failover from the availability instance N 230 to the availability instance M 240. The order in which interactions are switched may be based on their interdependencies. In some embodiments, such as planned migration, the operations of the example application at the availability instance N 230 may be shut down or otherwise phased out before or during the failover process. In other embodiments, the operations at the availability instance N 230 may abruptly terminate, such as during natural disasters. In such instances, the failover automation may include steps in which transactions which may have been lost due to the abrupt nature of the shutdown may be reconstructed.

FIGS. 3A-3C depict charts listing example components of which may include an application instance and their attributes for an automated application failover system, in accordance with some embodiments of the present disclosure. FIG. 3A depicts chart 300, FIG. 3B depicts chart 302, and FIG. 3C depicts chart 304. Each of the charts 300, 302, and 304, illustrates example products and attributes corresponding to various products which are found in an application process or failover inventory (e.g., the application process inventory 102 of FIG. 1). The charts 300 and 302 also show a component tier for the listed products, in which a component tier may be useful in grouping operations but is not required for an application process inventory. The component tiers include a database tier, an application tier, a storage tier, a messaging tier, and a task scheduler tier, but the listed component tiers do not constitute an exhaustive list. The products listed include SQL server, Oracle, Mongo, PostgreSQL, UDB, AppEngine, SRDF, NAS, MQ, Windows, Linux, API, Health Check, IIS, Citrix, Verbose, Task Scheduler, EQE, GSLB, VCS, Ansible, and other product. The list of products should not be considered exhaustive, and custom products and inventor attributes are envisioned as part of this workflow and disclosure. The inventory attributes may vary by product. In some embodiments, all available inventory attributes may be attributed to each product, where some inventory attributes are filled with null or zero values. In other embodiments, each product or application corresponds to only those inventory attributes with non-null values. Example inventory attributes include DNS, Hostname (for SQL Server products), Hostname, Client Path, Inventory ID, Ansible Template ID, Max Time (for NAS mount and unmount operations), and Delay Time (for a Delay Timer). The inventory attributes may be expanded as needed and adjusted for each product, application, and datacenter instance.

FIG. 4 depicts a chart listing example steps for an application failover process, in accordance with some embodiments of the present disclosure. FIG. 4 depicts chart 402, which depicts example steps for an example application failover automation, such as found in the application process inventory 102 and/or the failover workflow data model 106 of FIG. 1. The chart 402 includes information about step order (i.e., step number), step tier (i.e., approval, database, application, etc.), step product (i.e., SQL Server, Ansible, etc.), step action (i.e., approval, precheck, delay timer, etc.), and a summary of the action taking place for the step. Each step of the chart 402 may correspond to one or more sub steps, and/or depend on one or more other step. For example, initiation of a route status at step 7 may require that the delay timer of step 6 has finished or terminated. In another example, the container status checks of 5 steps 10 to 14 may depend on each other or one or more of the route status check of steps 7 and 9. When applications are interdependent, failover automation may include steps directed to both application in parallel, series, or a combination thereof.

FIG. 5 depicts a chart listing example input for a step in an application failover process, in accordance with some embodiments of the present disclosure. FIG. 5 depicts chart 502, which depicts example input into a JSON model for automation (i.e., the input into the JSON transformation 110 of FIG. 1). The chart 502 depicts a step description, a database tier, a tier, a product, a type, an action, a step and dependent step, a from datacenter, a to datacenter, and an instance name for an example SQL server failover. These step attributes are examples only, and not an exhaustive list of step attributes, which may be greater or fewer both for SQL server failover and for other applications and step descriptions. The chart 502 is an example depicting in more detail a step of the failover automation (such as those steps of FIG. 4) which includes data from the inventory attributes (such as those depicted in FIGS. 3A-3C).

FIG. 6 depicts a chart showing example partition of steps between data storage modes for a step in an application failover process, in accordance with some embodiments of the present disclosure. FIG. 6 depicts chart 602, which depicts example partitioning between data stored in BPMN XML markups and metadata storage for run-time metadata values. The chart depicts a JSON input, such as shown in FIG. 5, and its storage location. In the example, Component Name, From Datacenter, and To Datacenter are mapped to BPMN XML markups, while Component Execution Type, Instance DC, Tier, Product, Action, Instance Name, Step Number, Dependencies, and Workflow Identifiers are mapped to metadata storage. These JSON inputs are provided for example only, and may vary with product, action, tier, etc. BPMN XML markups may include manual tasks, service tasks, sequence flows, etc. BPMN XML markups may also include exclusive and/or parallel gateway information. The partition depicted in chart 602 is exemplary only, and values may be stored differently in some instances.

FIGS. 7A-7C depict charts listing example products and corresponding virtual engineers for an application process failover, in accordance with some embodiments of the present disclosure. FIG. 7A depicts chart 702, FIG. 7B depicts chart 704, and FIG. 7C depicts chart 706. Each of the charts 702, 704, and 706, illustrates example products and one or more corresponding virtual engineer actions (i.e., which include the failover automation 150 of FIG. 1). The virtual engineers include Execute Ansible Template (for Ansible), Status Service, Start Service, and Stop Service (for Citrix Service), Failover (for Mongo DB), and Enable, Disable, Status, Start, and Stop (for Task Scheduler Service). The product and virtual engineer action list is for illustration and does not constitute an exhaustive list of either products or virtual engineer actions.

Figure 8:
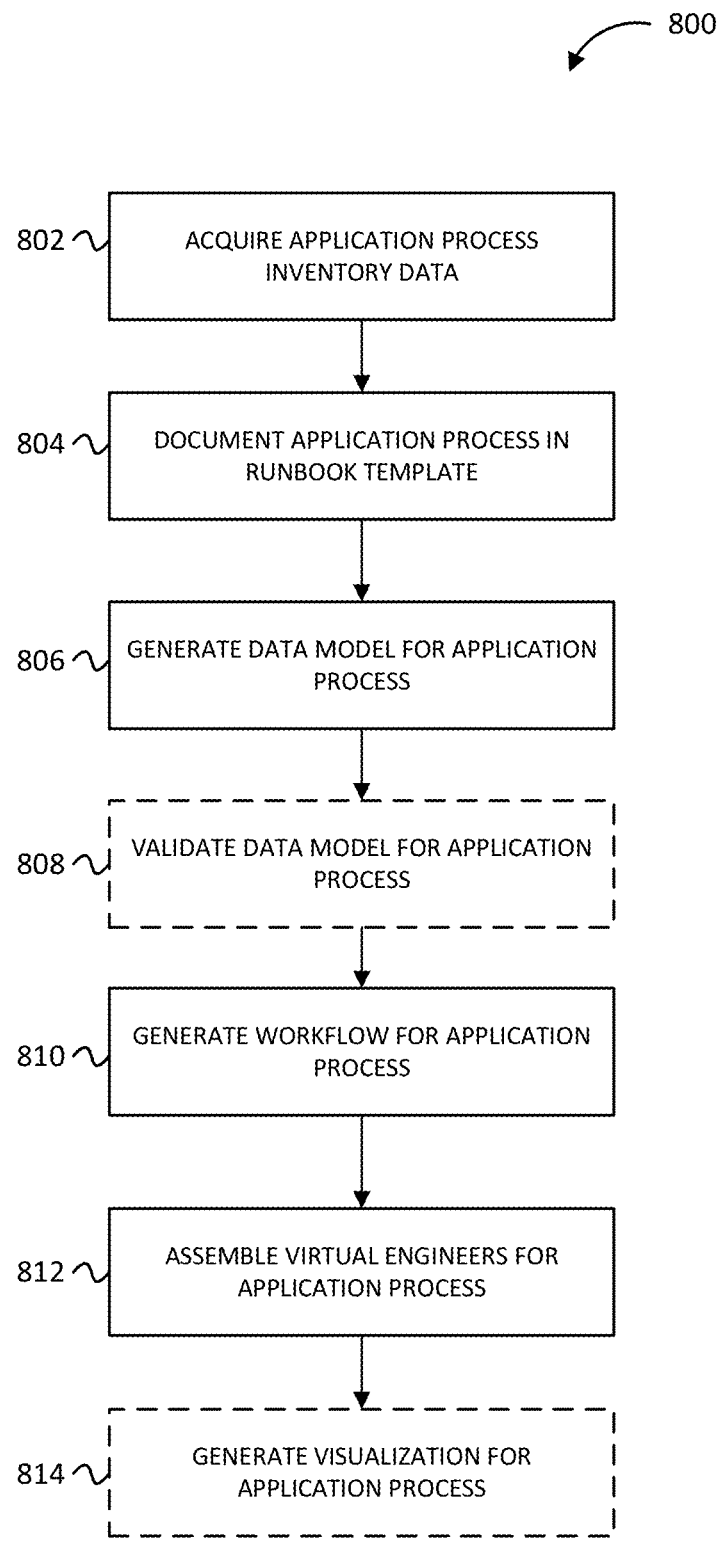
FIG. 8 is a flow chart illustrating a method for automating an application process, in accordance with some embodiments of the present disclosure.

FIG. 8 is a flow chart illustrating a method for automating an application process, in accordance with some embodiments of the present disclosure. FIG. 8 depict example operations for a method 800. At block 802, application process inventory data is acquired. The application process may be a failover process, or other migration process, for an application which relies on remove storage and/or computing elements. The application process inventory data may be acquired from a runbook or runbook template, from a manual failover record, and/or from a datacenter or data traffic scraping application.

At block 804, in some embodiments, the application process inventory may be documented in a runbook template. The runbook template is a standardized data format which lists the steps and attributes of the application process. The runbook template may be constructed in Microsoft Excel or another program.

At block 806, in some embodiments, a data model for the application process may be generated. The data model may be a JSON data exchange format model, in a non-limiting example. The data model may be generated based on the runbook template and may be generated by one or more onboarding platforms. The data model generation may be automated, manual, or a combination of automated and manual. The data model may be an organized set of data containing those steps of the application process inventory which comprise a failover operation. The data model may be comprised of elements, values for parameters for those elements, and relational attributes between such elements. For example, the data model can be comprised of an element corresponding to an action in the failover, such as a switch to a backup database, parameters associated with the switch or with the database, such as the backup database name, a time associated with the switch, etc., and a relation between the element (the database switch) and at least one other element. The relational attributes can include dependencies—e.g., the database switch can occur after a messaging queue is established—and components and subcomponents—e.g., the database switch can occur in separate steps.

At block 808, in some embodiments, the data model may be optionally validated. In some embodiments, the runbook template may be validated as well or instead. Validation of the data model involves determining if the data model performs the intended application process. Validation of the data model may involve determining if the components of the data model correspond to the respective applications of the data model. Validation of the data model may involve determining if the devices, attributes, locations, etc. corresponding to the respective applications are valid, accurate, accessible, etc.

At block 810, in some embodiments, a workflow may be generated for the application process. The workflow may be a BPMN 2.0 workflow, in a non-limiting example. The workflow may contain both an encoded and a graphical representation of the workflow. The workflow may include BPMN XML markups and metadata storage. The workflow may be stored on or in communication with one or more server or data repository. The workflow may include alternate path and processes in addition to the primary application process, such as process change tracking, process evaluation, synthetic process testing, process readiness testing, etc. In some embodiments, the workflow may include a visualization of the workflow or may include an option to generate a visualization of the workflow. The workflow can be a graphical workflow.

At block 812, in some embodiments, virtual engineers for the application process may be assembled. As understood herein, virtual engineers may include autonomous programs, code, microservices, etc. which implement portions of the workflow. The virtual engineers may be called from one or more library and may interact with one another. The virtual engineers may operate independently, dependently, in series, in parallel, etc. The input to the virtual engineers may be encoded in the workflow or obtained by the virtual engineer and/or workflow process from data storage, a library, etc. Virtual engineers may also be referred to as "virtual engineering activities." Virtual engineers may be autonomous operations and programs and/or instructions to cause autonomous operations thereof, rather than human operators.

At block 814, in some embodiments, a visualization for the application process may optionally be generated. The visualization may include each step of the application process, each step of the application process for which a virtual engineer is operable or may group multiple steps or sub steps together. The visualization may be interactive, such that a user or controller may change the application process from the visualization. The visualization may be web-based or application based.

Figure 9:
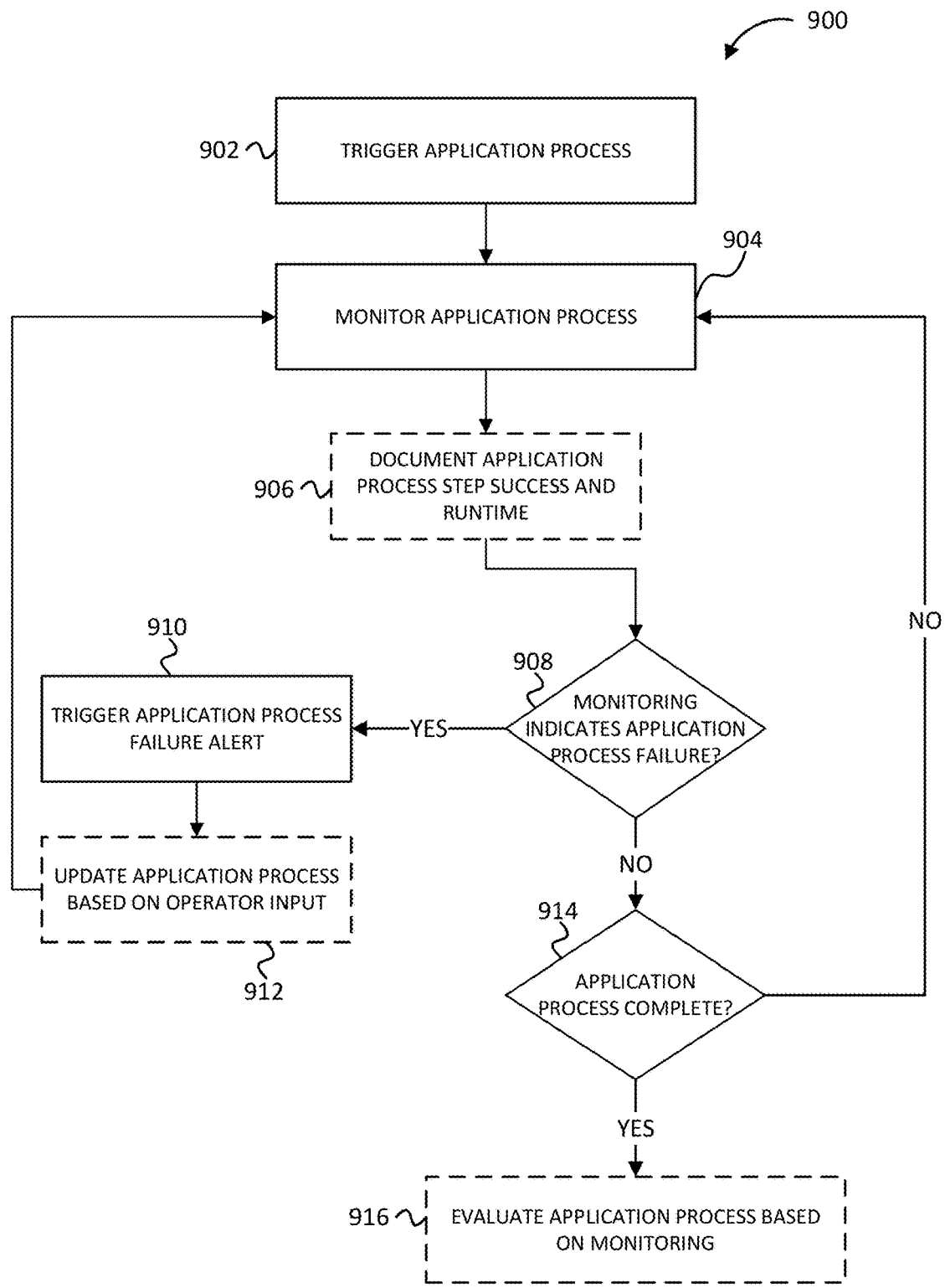
FIG. 9 is a flow chart illustrating a method for monitoring an automated application process, in accordance with some embodiments of the present disclosure.

FIG. 9 is a flow chart illustrating a method for monitoring an automated application process, in accordance with some embodiments of the present disclosure. FIG. 9 depicts example operations for a method 900. At block 902, in some embodiments, an application process may be triggered. The application process may be triggered based on a manual trigger, based on detection of a datacenter or database outage, etc. The application process may be a failover process, a migration process, a failover readiness test, etc.

At block 904, in some embodiments, the application process may be monitored. Monitoring the application process may include tracking runtime for various application steps, documenting success or failure of various steps, tracking communication between the application and various remote elements, etc. Monitoring of the application process may be periodic or continuous.

At block 906, in some embodiments, the application process step success and time may optionally be documented. The documentation may include calculation of various application process metrics based on run time and success and/or failure of various steps. The documentation may include outputting application process metrics to a user or data storage.

At block 908, in some embodiments, it may be determined whether the monitoring indicated application process failure. Application process failure may include non-completion of a step of the application process, non-completion within a time frame, partial completion of a step of the application process, non-validation of a completed step of the application process, etc. Application process failure may result from a time out or lock out, such as if permissions are not initialized correctly. Application process failure may occur if a manual step, such as a failsafe lockout, is not performed. Application process failure may also result from a manual cancellation of the application process. If an application process failure is indicated, flow may continue to block 910. If an application process failure is not indicated, flow may continue to block 914.

At block 910, in some embodiments, an application process failure alert may be triggered. The failure alert may be an automated alert on an application process visualization (i.e., the application process visualization website or program). The failure alert may be an automated email, text, or call to a technician. The failure alert may stop the application process. In some embodiments, the application process may continue along an alternative path or workflow based on the failure alert. In some embodiments, the application process may continue after the failure alert, in which one or more steps or sub steps may be incomplete.

At block 912, in some embodiments, the application process may optionally be updated based on operator input. The application process may be rerouted, or one or more non-complete step may be retried. If the operator determines that the failure alert represents a non-critical application process step, the application process may be allowed to continue. If the application process continues, monitoring of the application process at block 904 may continue.

At block 914, in some embodiments, it may be determined if the application process is complete. The application process may be determined to be complete after one or more validations (e.g., a failover completion validation, a backup instance operation validation, etc.), at the end of monitoring, after the last step in the workflow has executed, etc. Application process completion may be monitored continuously or periodically. If the application process is complete flow continues to block 916. If the application process flow is not complete, flow continues to block 904 where monitoring of the application process continues.

At block 916, in some embodiments, the application process may be optionally evaluated based on the monitoring. The monitoring may be recorded in real time and compared to ideal or goal application process run times and operations. The application process may be compared to recovery time objectives (RTOs), which may be contractually or governmentally mandated. The application process may be improved based on evaluation of the application process monitoring.

Figure 10:
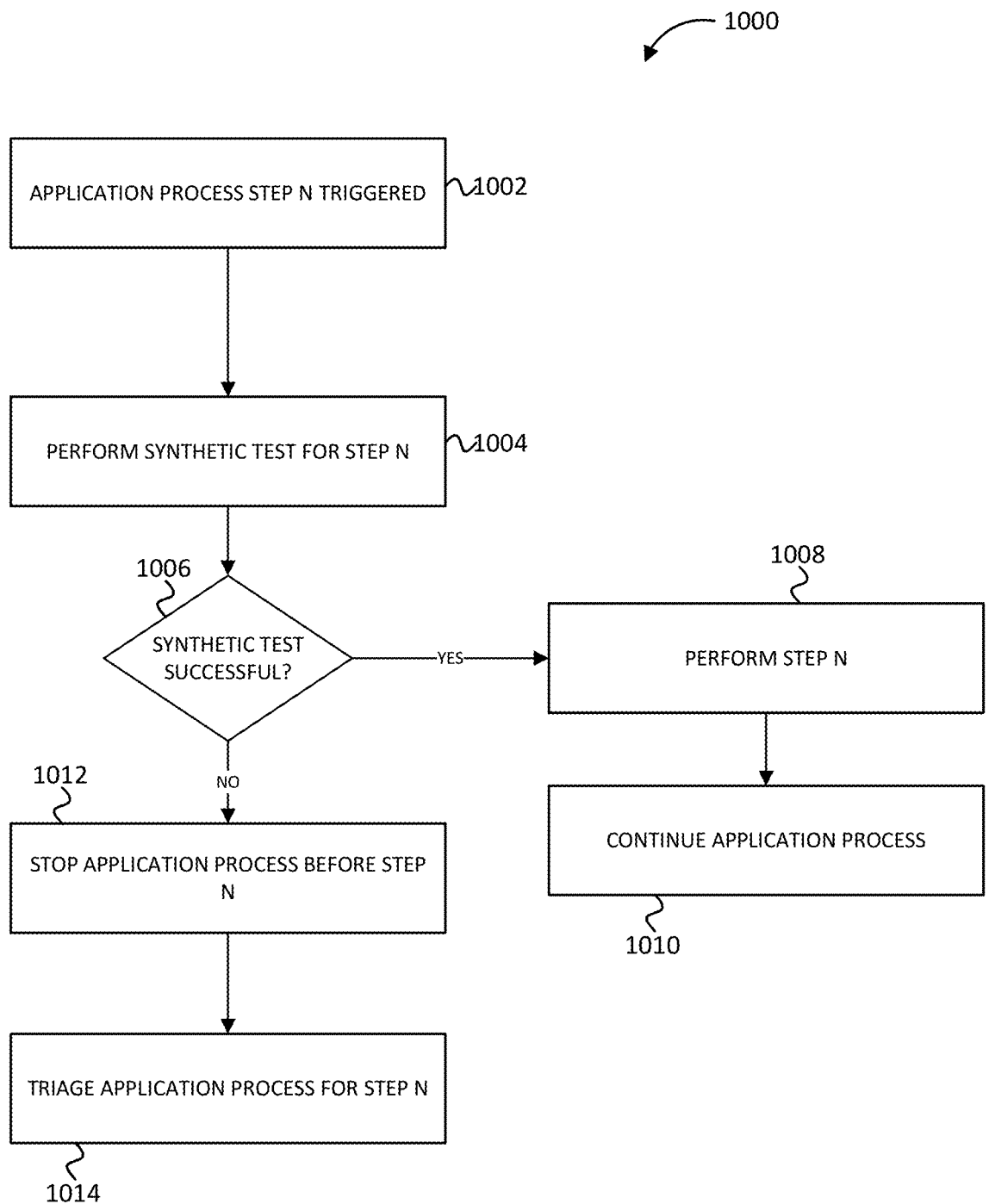
FIG. 10 is a flow chart illustrating a method for synthetic testing of an automated application process, in accordance with some embodiments of the present disclosure.

FIG. 10 is a flow chart illustrating a method for synthetic testing of an automated application process, in accordance with some embodiments of the present disclosure. FIG. 10 depicts example operations for a method 1000. At block 1002, a step N for an application process is triggered. The step N may be any step or sub step of the application process. The step N may be triggered by the completion of a previous step (i.e., a step N−1), manually triggered, triggered by a timer, etc. The step N may involve one or more migration or initialization step.

At block 1004, in some embodiments, a synthetic test for step N may be performed. The synthetic test may include an instance of step N in which some or all of step N is performed. For example, if step N is an initialization step, the synthetic test may be an initialization of an instance of an application (i.e., the application of the application process) but without migration of the application to the newly initialized instance. Synthetic tests may test operate for one or more steps (i.e., steps N and N+1 are both tested before steps N and N+1 are performed), or sub steps.

At block 1006, in some embodiments, it may be determined if the synthetic test was successful. The success of the synthetic test may be determined based on the completion of the synthetic test, a stability of the step(s) performed during the synthetic test, etc. If the synthetic test is successful, flow continues to block 1008. If the synthetic test is not successful, flow continues to block 1012.

At block 1008, in some embodiments, if the result of a step at the block 1006 was that the test was successful, then step N may be performed. Step N may be performed, for example, as outlined in the application process workflow.

At block 1010, in some embodiments, the application process continues. Additional steps of the application process may include synthetic tests.

At block 1012, in some embodiments, if the result of a step at the block 1006 was that the test was unsuccessful, then the application process may be stopped before step N is performed. For example, in some embodiments, the application process may be terminated or paused, such as until a determination about the stability of step N may be made. An alert or notification to an operator may be triggered by an unsuccessful synthetic test or by the application process stop.

At block 1014, in some embodiments, the application process for step N may be triaged. This may involve, e.g., amending the workflow or rerouting the application process. This may involve updating one or more address for the step N. For example, step N may fail if a DNS or Hostname is incorrect. Updating or manually entering a correct or updated value for step N may allow the process to continue. In some embodiments, if step N is updated, the synthetic test (i.e., of block 1006) is performed again. In some embodiments, step N may be skipped or alternative steps performed.

Figure 11A:
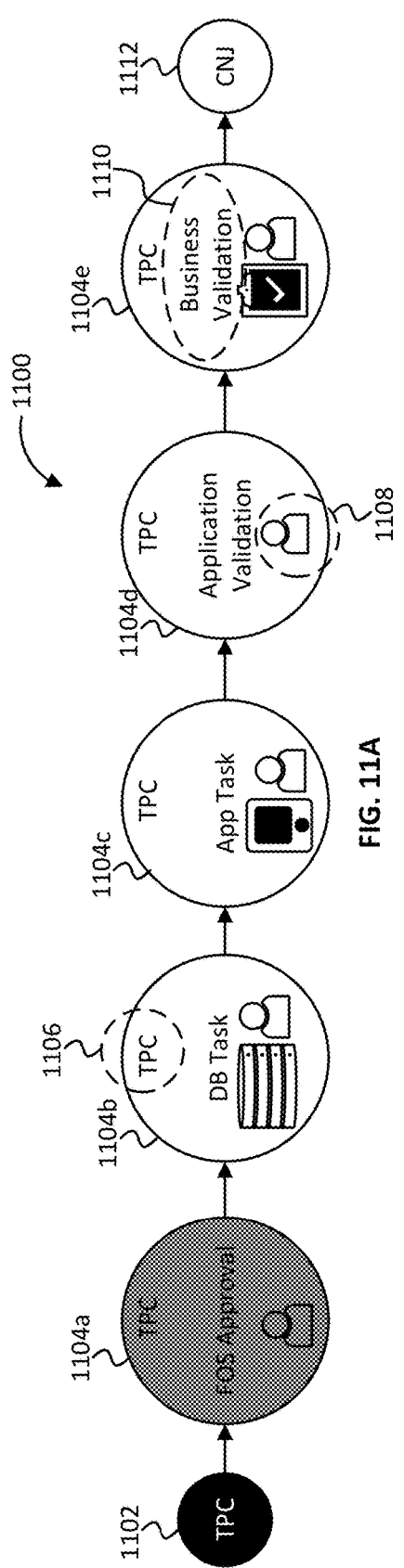
FIGS. 11A and 11B depict example automatic failover visualizations, in accordance with some embodiments of the present disclosure.
Figure 11B:
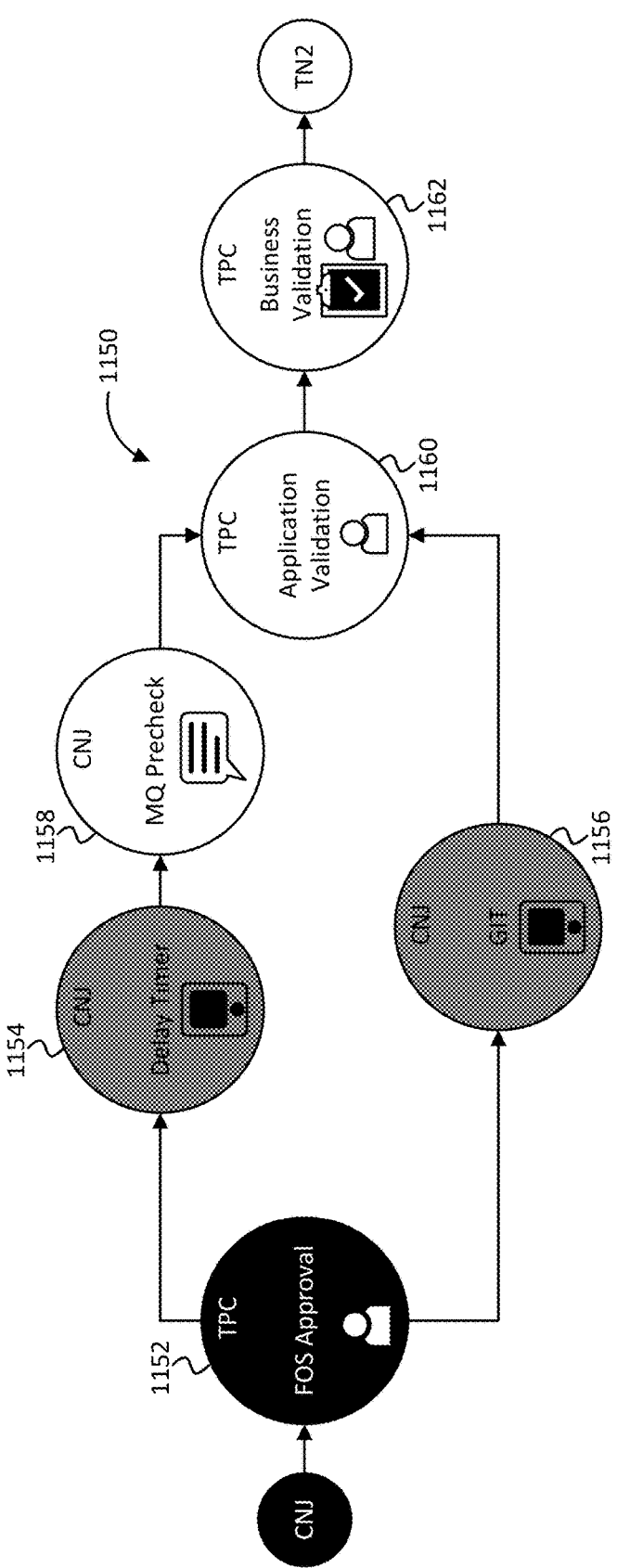

FIGS. 11A and 11B depict example automatic failover visualizations, in accordance with some embodiments of the present disclosure. FIG. 11A depicts an illustration 1100 of a visualization, representing sequential steps. The example visualization includes icons 1104*a*-1104*e* representing steps of the application and/or failover process. Each icon 1104*a*-1104*e* may represent a coarse step in the process (which may correspond to one or more steps or sub steps). Additional data about fine steps may be stored or displayed in another or supplementary location. Starting point 1102 may represent the primary datacenter, while end point 1112 may represent the secondary datacenter. For failover monitoring or testing, the primary datacenter and secondary datacenter may be the same. Identifier 1106 may represent the datacenter the step represented by the icon is launched from to performed at. Identifier 1110 may indicate the identity of the step or which process corresponds to the icon 1104*a*-1104*e*. Additional icons 1108 may indicate which services are involved in the step (i.e., a database, an application process, etc.) and/or may indicate which process are manual, validation-based, etc. A color of the icon 1104*a*-1104*e* may indicate the progress of the application process step corresponding to the icon. Gray is shown for the icon 1104*a*, while the icons 1104*b*-1104*e* are depicted in white, but it should be understood that full color icons may be used.

FIG. 11B depicts an illustration 1150 of a visualization, including parallel step icons. The example visualization includes icons 1152-1162 representing steps of the application and/or failover process. The icons 1152 and 1158 represent steps performed in parallel with the step represented by the icon 1156. Multiple parallel steps may be included in the workflow (i.e., two or more parallel processes may occur), along with dependent steps and steps that are both parallel and in series with other steps. In some embodiments, parallel steps may represent alternative paths, such as when multiple backup datacenters are employed or applications are interdependent.

Figure 12:
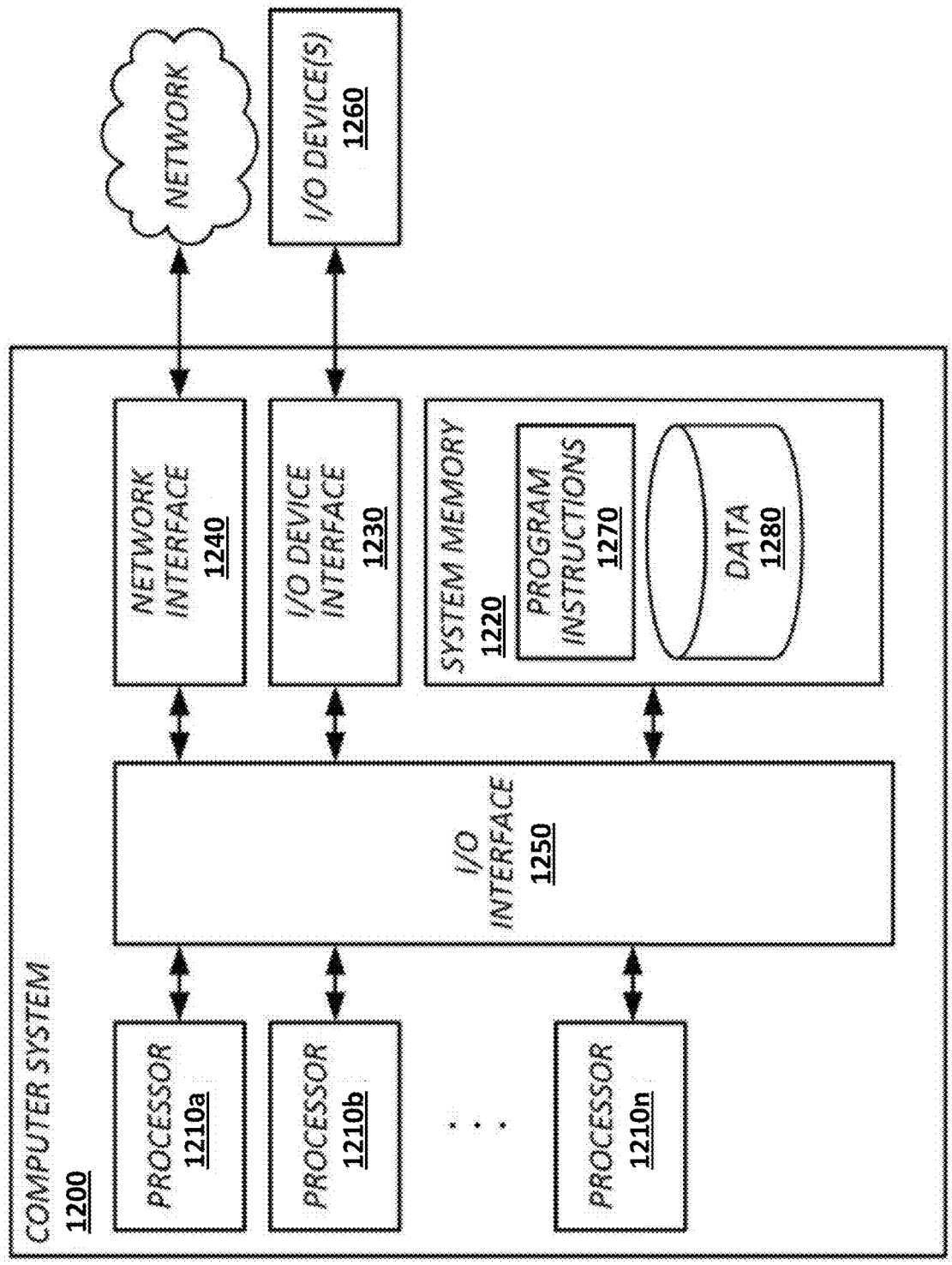
FIG. 12 is a schematic of a computing system, in accordance with some embodiments of the present disclosure.

FIG. 12 is a schematic of a computing system, in accordance with some embodiments of the present disclosure. FIG. 12 is a diagram that illustrates an exemplary computing system 1200 in accordance with embodiments of the present disclosure. Various portions of systems and methods described herein, may include or be executed on one or more computing systems similar to computing system 1200. Further, processes and modules described herein may be executed by one or more processing systems similar to that of computing system 1200.

Computing system 1200 may include one or more processors (e.g., processors 1210*a*-1210*n*) coupled to system memory 1220, an input/output I/O device interface 1230, and a network interface 1240 via an input/output (I/O) interface 1250. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1200. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1220). Computing system 1200 may be a uni-processor system including one processor (e.g., processor 1210*a*), or a multi-processor system including any number of suitable processors (e.g., 1210*a*-1210*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus may also be implemented as, special purpose logic circuitry, e.g., an FPGA (field programmable gate array) or an ASIC (application specific integrated circuit). Computing system 1200 may include a plurality of computing devices (e.g., distributed computing systems) to implement various processing functions.

I/O device interface 1230 may provide an interface for connection of one or more I/O devices 1260 to computing system 1200. I/O devices may include devices that receive input (e.g., from a user) or output information (e.g., to a user). I/O devices 1260 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1260 may be connected to computing system 1200 through a wired or wireless connection. I/O devices 1260 may be connected to computing system 1200 from a remote location. I/O devices 1260 located on remote computing system, for example, may be connected to computing system 1200 via a network and network interface 1240.

Network interface 1240 may include a network adapter that provides for connection of computing system 1200 to a network. Network interface 1240 may facilitate data exchange between computing system 1200 and other devices connected to the network. Network interface 1240 may support wired or wireless communication. The network may include an electronic communication network, such as the Internet, a local area network (LAN), a wide area network (WAN), a cellular communications network, or the like.

System memory 1220 may be configured to store program instructions 1270 or data 1280. Program instructions 1270 may be executable by a processor (e.g., one or more of processors 1210a-1210n) to implement one or more embodiments of the present techniques. Instructions 1270 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1220 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random-access memory (SRAM), synchronous dynamic RAM (SDRAM)), bulk storage memory (e.g., CD-ROM and/or DVD-ROM, hard drives), or the like. System memory 1220 may include a non-transitory computer readable storage medium that may have program instructions stored thereon that are executable by a computer processor (e.g., one or more of processors 1210a-1210n) to cause the subject matter and the functional operations described herein. A memory (e.g., system memory 1220) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1250 may be configured to coordinate I/O traffic between processors 1210a-1210n, system memory 1220, network interface 1240, I/O devices 1260, and/or other peripheral devices. I/O interface 1250 may perform protocol, timing, or other data transformations to convert data signals from one component (e.g., system memory 1220) into a format suitable for use by another component (e.g., processors 1210a-1210n). I/O interface 1250 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 1200 or multiple computing systems 1200 configured to host different portions or instances of embodiments. Multiple computing systems 1200 may provide for parallel or sequential processing/execution of one or more portions of the techniques described herein.

Those skilled in the art will appreciate that computing system 1200 is merely illustrative and is not intended to limit the scope of the techniques described herein. Computing system 1200 may include any combination of devices or software that may perform or otherwise provide for the performance of the techniques described herein. For example, computing system 1200 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 1200 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 1200 may be transmitted to computing system 1200 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computing system configurations.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 1200 may be transmitted to computing system 1200 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computing system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, the applicant has grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computing system" performing step A and "the computing system" performing step B may include the same computing device within the computing system performing both steps or different computing devices within the computing system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and may be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

Embodiments of the disclosure provide real world improvements to current failover technologies by leveraging individual automations in a coordinated way to achieve failover, including parallel execution where possible, management of interdependencies, and support for unlimited in-line approvals. Furthermore, various embodiments provide a unique user interface that provides multiple live views to monitor failover; views support coarse-gained component level failover status tracking and fine-grained BPMN style view of every detailed activity in the failover process.

Further real world improvements include the implementation of a digital runbook in failover automation. In various embodiments, the digital runbook may reflect, e.g., exactly or proximately, the steps necessary to failover the application and is integrated into the inventory system for continuous awareness of the environment and components that need to be failed-over. This effectively eliminates the risk of the documentation becoming stale.

Embodiments of the systems and methods described herein continuously evaluate secondary data centers for failover readiness as the application level and may continuously monitor for configuration drift, and continuously monitor services and infrastructure to ensure they are ready to be failed over to. In some embodiments, the platform may collect start/stop times automatically, may be aware of recovery time objectives (RTO) for applications/services, and/or may be able to provide a live countdown against the recovery time objective as failover is occurring. The system may also provide trends and metrics around success against RTO over time.

Furthermore, in some embodiments, the systems and methods described herein may automatically test components when each component is failed-over and automatically trigger application level tests when failover is complete. Any issues detected by automation are automatically entered into the ticketing system and fed into a tracking, monitoring, and escalation workflow. Each of the above described benefits constitute real world improvements to currently available failover technology by preserving data storage and greatly minimizing required processing power, eliminating unnecessary steps and maximizing resources.

The present techniques will be better understood with reference to the following enumerated embodiments:

Embodiment 1: A method for providing failover automation comprising: obtaining, by a processor, a process inventory for a failover of an application from a first data center to a second data center; generating, by the processor, a data model for the failover based on the process inventory; generating, by the processor, a workflow for the failover based on the data model; assembling, by the processor, a set of one or more virtual engineering activities to perform the failover for the application based on the workflow; and performing, by the processor, the failover for the application with the set of one or more virtual engineering activities based on the workflow.

Embodiment 2: The method of embodiment 1, wherein performing the failover further comprises monitoring at least one metric of the failover.

Embodiment 3: The method of embodiment 2, wherein monitoring the at least one metric further comprises outputting the at least one metric of the failover.

Embodiment 4: The method of embodiment 2, wherein monitoring the at least one metric further comprises evaluating the failover based on the at least one metric; and wherein the at least one metric is at least one of a recovery time, a recovery time objective, a completion status, a binary success tracker, a timer, or a combination thereof Embodiment 5: The method of embodiment 1, wherein generating the data model further comprises validating the data model.

Embodiment 6: The method of embodiment 5, wherein validating the data model comprises: determining whether a workflow for the failover can be generated based on the data model; based on a determination that the workflow for the failover can be generated based on the data model, outputting the data model for generation of a workflow; and based on a determination that the workflow for the failover cannot be generated based on the data model, generating a data model validation failure notification.

Embodiment 7: The method of embodiment 6, wherein validating the data model comprises: comparing steps of the data model to steps of the process inventory; determining whether the steps of the data model comprise the steps of the process inventory; based on a determination that the steps of the data model comprise the steps of the process inventory, outputting the data model for generation of a workflow; and based on a determination that the steps of the data model do not comprise the steps of the process inventory, generating a data model validation failure notification.

Embodiment 8: The method of embodiment 1, wherein the process inventory comprises a set of sub processes, and wherein generating a data model comprises generating one or more entries in the data model for each sub process in the process inventory.

Embodiment 9: The method of embodiment 1, wherein generating a workflow comprises generating a set of ordered operations, wherein the set of ordered operations comprise virtual engineering activities, and a set of metadata, wherein the set of metadata comprises parameters for the virtual engineering activities.

Embodiment 10: The method of embodiment 1, wherein performing the failover comprises executing an automatic takeover of the application from the first data center to the second data center.

Embodiment 11: The method of embodiment 1, wherein performing the failover comprises initiating an application at the second data center.

Embodiment 12: The method of embodiment 1, further comprising generating, by the processor, a visualization for the failover based on the workflow.

Embodiment 13: The method of embodiment 1, wherein the process inventory is a runbook template.

Embodiment 14: The method of embodiment 1, wherein the workflow is based on a BPMN model.

Embodiment 15: A system for providing failover automation comprising: a computer having a processor and a memory; and one or more code sets stored in the memory and executed by the processor to: obtain a process inventory for a failover of an application from a first data center to a second data center; generate a data model for the failover based on the process inventory; generate a workflow for the failover based on the data model; assemble a set of one or more virtual engineering activities to perform the failover for the application based on the workflow; and perform the failover for the application with the set of one or more virtual engineering activities based on the workflow.

Embodiment 16: The system of embodiment 15 wherein instructions to perform the failover further comprise instructions to monitor at least one metric of the failover.

Embodiment 17: The system of embodiment 16, wherein instructions to monitor the failover comprise instruction to output the at least one metric of the failover.

Embodiment 18: The system of embodiment 16, wherein instructions to monitor the failover comprise instruction to evaluate the failover based on the at least one metric; wherein the at least one metric is at least one of a recovery time, a recovery time objective, a completion status, a binary success tracker, a timer, or a combination thereof Embodiment 19: The system of embodiment 15, wherein instructions to generate the data model further comprise instruction to validate the data model.

Embodiment 20: The system of embodiment 15, further comprising instruction to generate a visualization for the failover based on the workflow.

Embodiment 21: One or more non-transitory, machine-readable medium having instructions for providing failover automation thereon, the instructions when executed by a processor being configured to perform operations comprising: obtaining a process inventory for a failover of an application from a first data center to a second data center; generating a data model for the failover based on the process inventory; generating a workflow for the failover based on the data model; and assembling a set of one or more virtual engineering activities to perform the failover for the application based on the workflow.

Embodiment 22: The one or more non-transitory, machine-readable medium of embodiment 21, further comprising: performing, by the processor, the failover for the application with the set of one or more virtual engineering activities based on the workflow.

Embodiment 23: The one or more non-transitory, machine-readable medium of embodiment 21, wherein performing the failover further comprises monitoring at least one metric of the failover.

Embodiment 24: The one or more non-transitory, machine-readable medium of embodiment 23, wherein monitoring the at least one metric further comprises outputting the at least one metric of the failover.

Embodiment 25: The one or more non-transitory, machine-readable medium of embodiment 21, wherein generating the data model further comprises validating the data model.

Embodiment 26: The one or more non-transitory, machine-readable medium of embodiment 21, further comprising generating, by the processor, a visualization for the failover based on the workflow.

What is claimed is:

1. A method for providing failover automation comprising:

obtaining, by a processor, a process inventory for a failover of an application from a first data center to a second data center, wherein the process inventory comprises a runbook template;

generating, by the processor, a data model for the failover based on the process inventory;

generating, by the processor, a workflow for the failover based on the data model, wherein the workflow comprises a business process modeling and notation (BPMN) model;

assembling, by the processor, a set of one or more virtual engineering activities to perform the failover for the application based on the workflow; and performing, by the processor, the failover for the application with the set of one or more virtual engineering activities based on the workflow.

2. The method of claim 1, wherein performing the failover further comprises:

monitoring at least one metric of the failover; and outputting to a user or data storage the at least one metric of the failover.

3. The method of claim 2, wherein the at least one metric comprises at least one of the following: a recovery time, a recovery time objective, a completion status, a binary success tracker, a timer, and a combination thereof.

4. The method of claim 1, wherein generating the data model further comprises validating the data model and wherein validating the data model comprises:

determining whether a workflow for the failover can be generated based on the data model; and based on a determination that the workflow for the failover can be generated based on the data model, outputting the data model for generation of a workflow.

5. The method of claim 4, wherein validating the data model comprises:

comparing steps of the data model to steps of the process inventory;

determining whether the steps of the data model correspond to one or more of the steps of the process inventory; and based on a determination that the steps of the data model correspond to one or more of the steps of the process inventory, outputting the data model for generation of a workflow.

6. The method of claim 1, wherein the process inventory comprises a set of sub processes, and wherein generating a data model comprises generating one or more entries in the data model for each sub process in the process inventory.

7. The method of claim 1, wherein generating a workflow comprises generating a set of ordered operations, wherein the set of ordered operations comprise virtual engineering activities, and a set of metadata, wherein the set of metadata comprises parameters for the virtual engineering activities.

8. The method of claim 1, wherein performing the failover comprises executing an automatic takeover of the application from the first data center to the second data center.

9. The method of claim 1, wherein performing the failover comprises initiating an application at the second data center.

10. The method of claim 1, further comprising generating, by the processor, a visualization in BPMN for the failover based on the workflow.

11. A system for providing failover automation comprising:

a computer having a processor and a memory; and one or more set of instructions stored in the memory and executed by the processor to:

obtain a process inventory for a failover of an application from a first data center to a second data center, wherein the process inventory comprises a runbook template;

generate a data model for the failover based on the process inventory;

generate a workflow for the failover based on the data model, wherein the workflow comprises a business process modeling and notation (BPMN) model;

assemble a set of one or more virtual engineering activities to perform the failover for the application based on the workflow; and perform the failover for the application with the set of one or more virtual engineering activities based on the workflow.

12. The system of claim 11 wherein instructions to perform the failover further comprise instructions to monitor at least one metric of the failover and to output to a user or data storage the at least one metric of the failover.

13. The system of claim 12, wherein the at least one metric is at least one of the following: a recovery time, a recovery time objective, a completion status, a binary success tracker, a timer, and a combination thereof.

14. The system of claim 11, further comprising instruction to generate a visualization in BPMN for the failover based on the workflow.

15. One or more non-transitory, machine-readable medium having instructions for providing failover automation thereon, the instructions when executed by a processor being configured to perform operations comprising:

obtaining a process inventory for a failover of an application from a first data center to a second data center, wherein the process inventory comprises a runbook template;

generating a data model for the failover based on the process inventory;

generating a workflow for the failover based on the data model, wherein the workflow comprises a business process modeling and notation (BPMN) model;

assembling a set of one or more virtual engineering activities to perform the failover for the application based on the workflow; and performing, by the processor, the failover for the application with the set of one or more virtual engineering activities based on the workflow.

16. The one or more non-transitory, machine-readable medium of claim 15, wherein performing the failover further comprises:

monitoring at least one metric of the failover; and outputting to a user or data storage the at least one metric of the failover.

17. The one or more non-transitory, machine-readable medium of claim 15, wherein generating the data model further comprises validating the data model, wherein validating the data model comprises:

determining whether a workflow for the failover can be generated based on the data model; and based on a determination that the workflow can be generated based on the data model, outputting the data model for generation of the workflow.

18. The one or more non-transitory, machine-readable medium of claim 15, further comprising generating, by the processor, a visualization in BPMN for the failover based on the workflow.

19. The method of claim 1, wherein the data model comprises a JavaScript Object Notation (JSON) data exchange format model.

20. The method of claim 1, wherein generating the data model further comprises validating the data model and wherein validating the data model comprises:
- determining whether a workflow for the failover can be generated based on the data model; and
- based on a determination that the workflow for the failover cannot be generated based on the data model, generating a data model validation failure notification.

21. The method of claim 4, wherein validating the data model comprises:
- comparing steps of the data model to steps of the process inventory;
- determining whether the steps of the data model correspond to one or more of the steps of the process inventory; and
- based on a determination that the steps of the data model do not correspond to one or more of the steps of the process inventory, generating a data model validation failure notification.

22. The method of claim 12, wherein generating the visualization in BPMN for the failover comprises:
- automatically generating a visualization for the failover, wherein the visualization comprises icons corresponding to steps in the failover.

23. The method of claim 22, wherein generating the visualization in BPMN for the failover further comprises:
- providing the visualization to a user display, wherein the visualization is automatically updated based on performance of the failover or one or more of the set of one or more virtual engineering activities.

24. The system of claim 11, wherein the data model comprises a JavaScript Object Notation (JSON) data exchange format model.

25. The one or more non-transitory, machine-readable medium of claim 15, wherein the data model comprises a JavaScript Object Notation (JSON) data exchange format model.

26. The one or more non-transitory, machine-readable medium of claim 18, wherein generating, by the processor, a visualization in BPMN for the failover based on the workflow further comprises:
- automatically generating a visualization for the failover, wherein the visualization comprises icons corresponding to steps in the failover;
- providing the visualization to a user display; and
- automatically updating the visualization based on performance of the failover or the set of one or more virtual engineering activities.

27. The one or more non-transitory, machine-readable medium of claim 15, performing the failover for the application comprises performing a synthetic failover for the application, wherein in the synthetic failover the application is tested for failover readiness but not migrated.

* * * * *